United States Patent
Rodriguez et al.

(10) Patent No.: US 11,679,644 B2
(45) Date of Patent: Jun. 20, 2023

(54) VEHICLE HVAC UNIT HAVING NOISE SUPPRESSION CASE

(71) Applicant: DENSO International America, Inc., Southfield, MI (US)

(72) Inventors: Javier Rodriguez, Royal Oak, MI (US); Alexander Blowytsky, Royal Oak, MI (US)

(73) Assignee: DENSO International America, Inc., Southfield, MI (US)

( * ) Notice: Subject to any disclaimer, the term of this patent is extended or adjusted under 35 U.S.C. 154(b) by 253 days.

(21) Appl. No.: 17/219,378

(22) Filed: Mar. 31, 2021

(65) Prior Publication Data

US 2022/0032730 A1 Feb. 3, 2022

Related U.S. Application Data (60) Provisional application No. 63/060,241, filed on Aug. 3, 2020.

(51) Int. Cl.
*B60H 1/00* (2006.01)

(52) U.S. Cl.
CPC ..... *B60H 1/00671* (2013.01); *B60H 1/00514* (2013.01); *B60H 2001/006* (2013.01); *B60H 2001/00714* (2013.01)

(58) Field of Classification Search
CPC .......... B60H 2001/006; B60H 1/00671; B60H 2001/00714; Y10S 454/906
USPC .......... 454/107–109, 143, 262, 906
See application file for complete search history.

(56) References Cited

U.S. PATENT DOCUMENTS

| 8,813,908 | B1 | 8/2014 | Liu et al. | |
|---|---|---|---|---|
| 2002/0009969 | A1* | 1/2002 | Sato | B60H 1/00671 454/139 |
| 2003/0054751 | A1* | 3/2003 | Parekh | B60H 1/00678 454/121 |
| 2004/0152410 | A1* | 8/2004 | Seki | B60H 1/00685 454/139 |
| 2004/0231834 | A1* | 11/2004 | Shibata | B60H 1/00678 165/204 |
| 2005/0095970 | A1* | 5/2005 | Ito | B60H 1/00678 454/96 |
| 2008/0026687 | A1* | 1/2008 | Maehata | B60H 1/00685 454/195 |
| 2016/0263967 | A1* | 9/2016 | Schaake | F16K 1/2261 |
| 2018/0345755 | A1* | 12/2018 | Nolta | B60J 5/0493 |

(Continued)

*Primary Examiner* — Ko-Wei Lin
(74) *Attorney, Agent, or Firm* — Harness, Dickey & Pierce, P.L.C.

(57) ABSTRACT

A heating, ventilation, and air condition (HVAC) unit including a casing and a door. The casing includes a body portion and a lip portion extending from the body portion. The body portion defines a first inlet opening and a second inlet opening. The door is pivotable between a first position in which ambient air is able to flow through the second inlet opening and air within an occupant cabin is restricted from flowing through the first inlet opening, and a second position in which ambient air is restricted from flowing through the second inlet opening and air within the occupant cabin is able to flow through the first inlet opening. A distance from an outward most location where the door and the lip portion contact each other to an edge of the lip portion that is further outwardly of the outward most location is between 0.1 millimeters and 5 millimeters.

20 Claims, 11 Drawing Sheets

(56) References Cited

U.S. PATENT DOCUMENTS

2019/0315200 A1\* 10/2019 Pestke .................. B60H 1/3421
2020/0086710 A1\* 3/2020 Thawani ............ B60H 1/00021

\* cited by examiner

VEHICLE HVAC UNIT HAVING NOISE SUPPRESSION CASE

CROSS-REFERENCE TO RELATED APPLICATION

This application is a U.S. patent application, which claims priority to and the benefit of U.S. Provisional Patent Application No. 63/060,241 filed on Aug. 3, 2020. The disclosure of the above applications is incorporated herein by reference.

FIELD

The present disclosure relates to a vehicle HVAC unit having a noise suppression case.

BACKGROUND

The statements in this section merely provide background information related to the present disclosure and may not constitute prior art.

A vehicle includes a heating, ventilation, and air conditioning (HVAC) unit that may be coupled to a vehicle dashboard and that provides conditioned air (e.g., heated and/or cooled and/or dehumidified or humidified and/or filtered) to a vehicle occupant cabin via one or more duct lines. The HVAC unit may include, inter alia, a casing and a door. The HVAC unit may be operable, for example, between a fresh air mode in which the door is in a first position wherein ambient air is able to flow through a first inlet and air within an occupant cabin is restricted from flowing through a second inlet, and a recirculation mode in which the door is in a second position wherein ambient air is restricted from flowing through the first inlet and air within the occupant cabin is able to flow through the second inlet. When the vehicle is being driven and the door is pivoting between first and second positions, there will exist a gap between the door and the casing at a certain position through the door travel, through which, noise can be generated due to ambient air flowing through the narrow gap. The present disclosure provides an HVAC unit that solves this and other issues associated with typical HVAC units.

SUMMARY

This section provides a general summary of the disclosure and is not a comprehensive disclosure of its full scope or all of its features.

In one form, the present disclosure discloses a heating, ventilation, and air condition (HVAC) unit including a casing a door. The casing includes a body portion and a lip portion extending from the body portion. The body portion defines a first inlet opening and a second inlet opening. The door pivotable between a first position in which ambient air is able to flow through the second inlet opening and air within an occupant cabin is restricted from flowing through the first inlet opening, and a second position in which ambient air is restricted from flowing through the second inlet opening and air within the occupant cabin is able to flow through the first inlet opening. The distance from an outward most location where the door and lip portion contact each other to an edge of the lip portion that is further outwardly of the outwardly most location is between 0.1 millimeters and 5 millimeters.

In some configurations, the lip portion includes a ramped surface.

In some configurations, the lip portion spans a width of the first inlet opening.

In some configurations, the door is sealingly engaged with the lip portion when the door is in the second position.

In some configurations, a blower unit is configured to draw in ambient air through the second inlet opening when the door is in the first position. The blower unit is configured to draw in air from the occupant cabin through the first inlet opening when the door is in the second position.

In some configurations, the door has a barrel shape.

In some configurations, the lip portion is externally located relative to the first inlet opening.

In some configurations, the lip portion is rectangular-shaped.

In some configurations, when the door is in the first position, the HVAC unit is in a fresh-air mode. When the door is in the second position, the HVAC unit is in an air-recirculation mode.

In some configurations, a motor drives the door between the first and second positions.

In some configurations, the lip portion includes an elongated slot formed therein.

In some configurations, the slot extends the majority of the transverse length of the door.

In another form, the present disclosure discloses a heating, ventilation, and air condition (HVAC) unit including a casing a door. The casing includes a body portion and a ledge. The body portion defines a first inlet opening and a second inlet opening. The ledge spans a width of the first inlet opening and is located externally relative to the first inlet opening. The door is coupled to the body portion. The door is pivotable between a first position in which ambient air is able to flow through the second inlet opening and air within an occupant cabin is restricted from flowing through the first inlet opening, and a second position in which ambient air is restricted from flowing through the second inlet opening and air within the occupant cabin is able to flow through the first inlet opening. A distance from an outward most location where the door and the ledge contact each other to an edge of the ledge that is further outwardly of the outward most location is between 0.1 millimeters and 5 millimeters.

In some configurations, the ledge includes a ramped surface.

In some configurations, the door is sealingly engaged with the ledge when the door is in the second position.

In some configurations, a blower unit is configured to draw in ambient air through the second inlet opening when the door is in the first position. The blower unit is configured to draw in air from the occupant cabin through the first inlet opening when the door is in the second position.

In some configurations, the door has a barrel shape.

In some configurations, the ledge is rectangular-shaped.

In some configurations, a motor drives the door between the first and second positions.

In some configurations, the lip portion includes an elongated slot formed therein.

In yet another form, the present disclosure discloses a heating, ventilation, and air condition (HVAC) unit including a casing, a door, and a blower unit. The casing includes a body portion and a ledge. The body portion defines a first inlet opening and a second inlet opening. The ledge spans a width of the first inlet opening and is located externally relative to the first inlet opening. The ledge includes a ramped surface. The barrel-shaped door is coupled to the body portion. The door is pivotable between a first position in which ambient air is able to flow through the second inlet opening and air within an occupant cabin is restricted from flowing through the first inlet opening, and a second position in which ambient air is restricted from flowing through the second inlet opening and air within the occupant cabin is able to flow through the first inlet opening. The blower unit is configured to draw in ambient air through the second inlet opening when the door is in the first position and is configured to draw in air from the occupant cabin through the first inlet opening when the door is in the second position. A distance from an outward most location where the door sealingly engages the ledge to a edge of the ledge that is further outwardly of the outward most location is between 0.1 millimeters and 5 millimeters.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
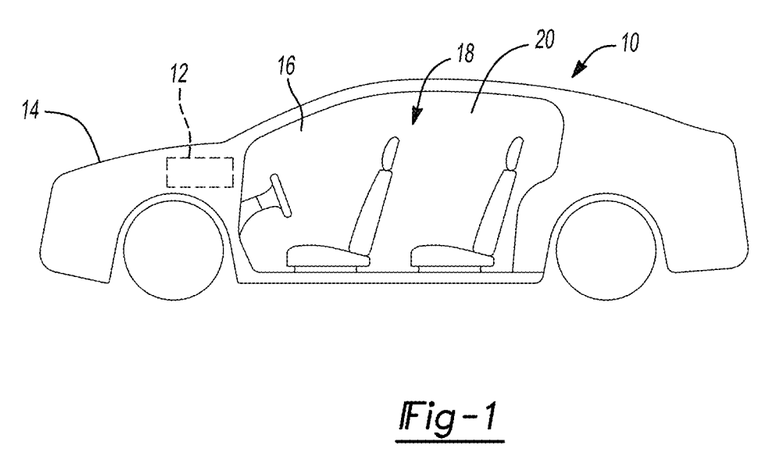
FIG. 1 is a representative vehicle including a heating, ventilation, and air conditioning (HVAC) unit in accordance with the present teachings.

As shown in FIG. 1, a vehicle 10 having a heating, venting, and air conditioning (HVAC) unit 12 is provided. The HVAC unit 12 is disposed in a front portion 14 of the vehicle 10. The HVAC unit 12 may provide airflow (e.g., heated and/or cooled) to a front region 16 of a vehicle cabin 18 via a front set of duct lines (not shown) and/or a rear region 20 of the vehicle cabin 18 via a rear set of duct lines (not shown). With reference to FIGS. 2-6, the HVAC unit 12 includes a main casing 22 (FIG. 2), a blower unit 24 (FIG. 2), and an inlet duct or casing 26.

Figure 2:
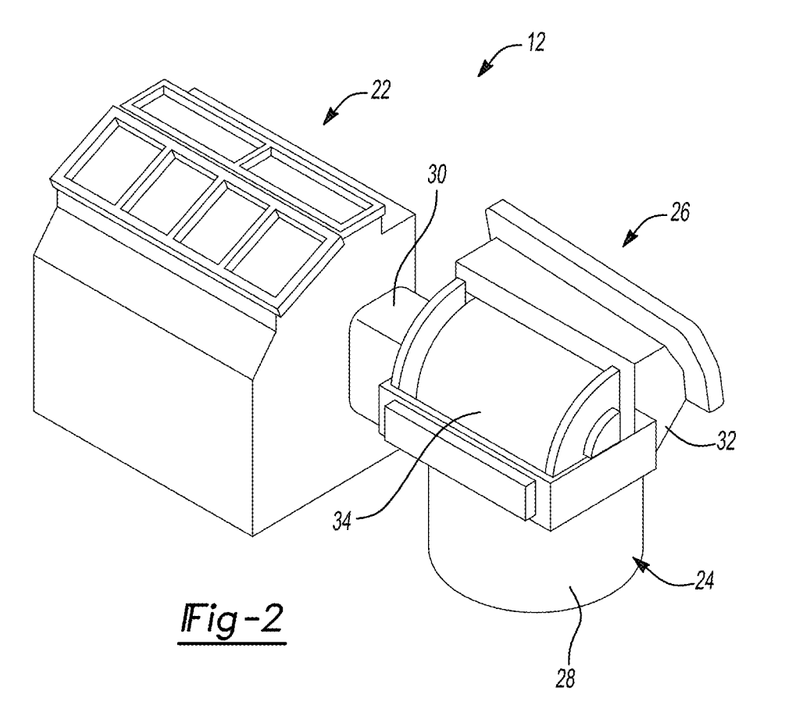
FIG. 2 is a perspective view of the HVAC unit of the vehicle of FIG. 1.
Figure 3:
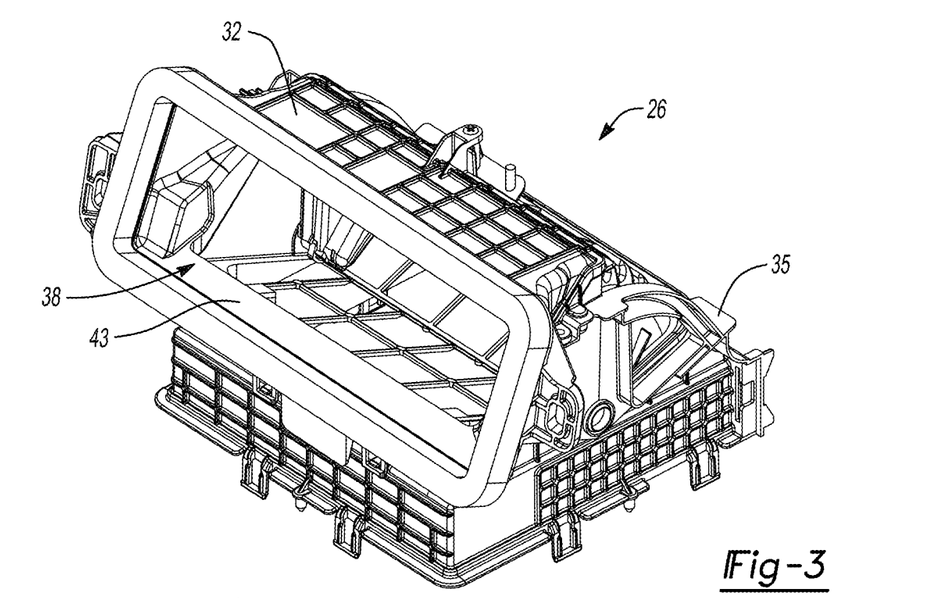
FIG. 3 is a perspective view of a portion of a front blower unit of the HVAC unit of FIG. 2 with a door in a first position.
Figure 4:
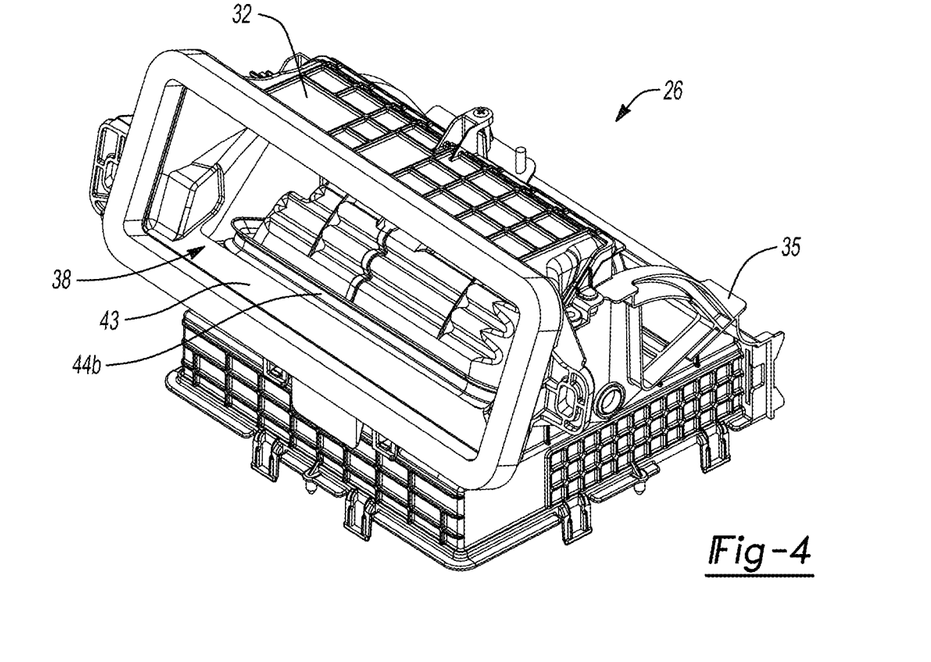
FIG. 4 is a perspective view of the portion of the front blower unit of the HVAC unit of FIG. 2 with the door in a second position.

The main casing 22 includes one or more shells formed of a molded plastic material, such as thermoplastic for example, and can be joined together by any suitable method, including plastic welding, or clips for example. The one or more shells of the main casing 22 may define a plurality of passageways (not shown). An evaporator (not shown) is disposed within the main casing 22 and may be positioned within one or more passageways of the main casing 22. The evaporator may be any suitable type of heat exchanger such as a plate-fin heat exchanger or a shell-tube heat exchanger, for example, configured to remove heat from air flowing across or through the evaporator. A heater core (not shown) is disposed within the main casing 22 and may be positioned within one or more passageways of the main casing 22. The heater core can be any suitable type of heat exchanger, such as a plate-fin heat exchanger or shell-tube heat exchanger, for example, configured to add heat to the air flowing across or through the heater core. In one example, ambient air drawn into the passageways of the main casing 22 via the blower unit 24 may be conditioned (e.g., heated and/or cooled) prior to exiting outlets (not shown) of the main casing 22 into the vehicle cabin 18 via the front set of duct lines and/or the rear set of duct lines. In another example, cabin air drawn in through the blower unit 24 may be conditioned prior to exiting the outlets into the vehicle cabin 18 via the front set of duct lines and/or the rear set of duct lines.

The blower unit 24 is fluidly coupled with the passageways of the main casing 22 and is configured to blow air through the passageways. The blower unit 24 includes a blower housing 28, a blower fan (not shown) and a blower motor (not shown). The blower housing 28 is coupled to the inlet casing 26 at one side and coupled to the main casing 22 (via an outlet duct 30) at another side. The blower fan is disposed within the housing 28. The blower motor is drivingly coupled to the blower fan and is operable between an ON mode and an OFF mode. The ON mode may have one or more settings (e.g., high, medium, low). When the blower motor is in the ON mode, the blower motor rotates the blower fan to draw air through the inlet casing 26 and into the passageways of the main casing 22 (via the blower housing 28 and the outlet duct 30).

With reference to FIGS. 2-6, the inlet casing 26 includes a body portion 32, a door 34 and a generally rectangular-shaped lip portion 35. The body portion 32 includes a first inlet opening 36 (FIG. 7) and a second inlet opening 38 (FIGS. 3, 4, 6, and 7). The first inlet opening 36 is in fluid communication with the vehicle cabin 18 and the second inlet opening 38 is in fluid communication with ambient surroundings of the vehicle 10. The first inlet opening 36 may include an area that is greater than an area of the second inlet opening 38. In some configurations, the second inlet opening 38 may include an area that is greater than an area of the first inlet opening 36. A filter (not shown) may be associated with (e.g., disposed within) the body portion 32 and may assist in removing pollutants from air flowing through the body portion 32 via the first and second inlet openings 36, 38.

Figure 5:
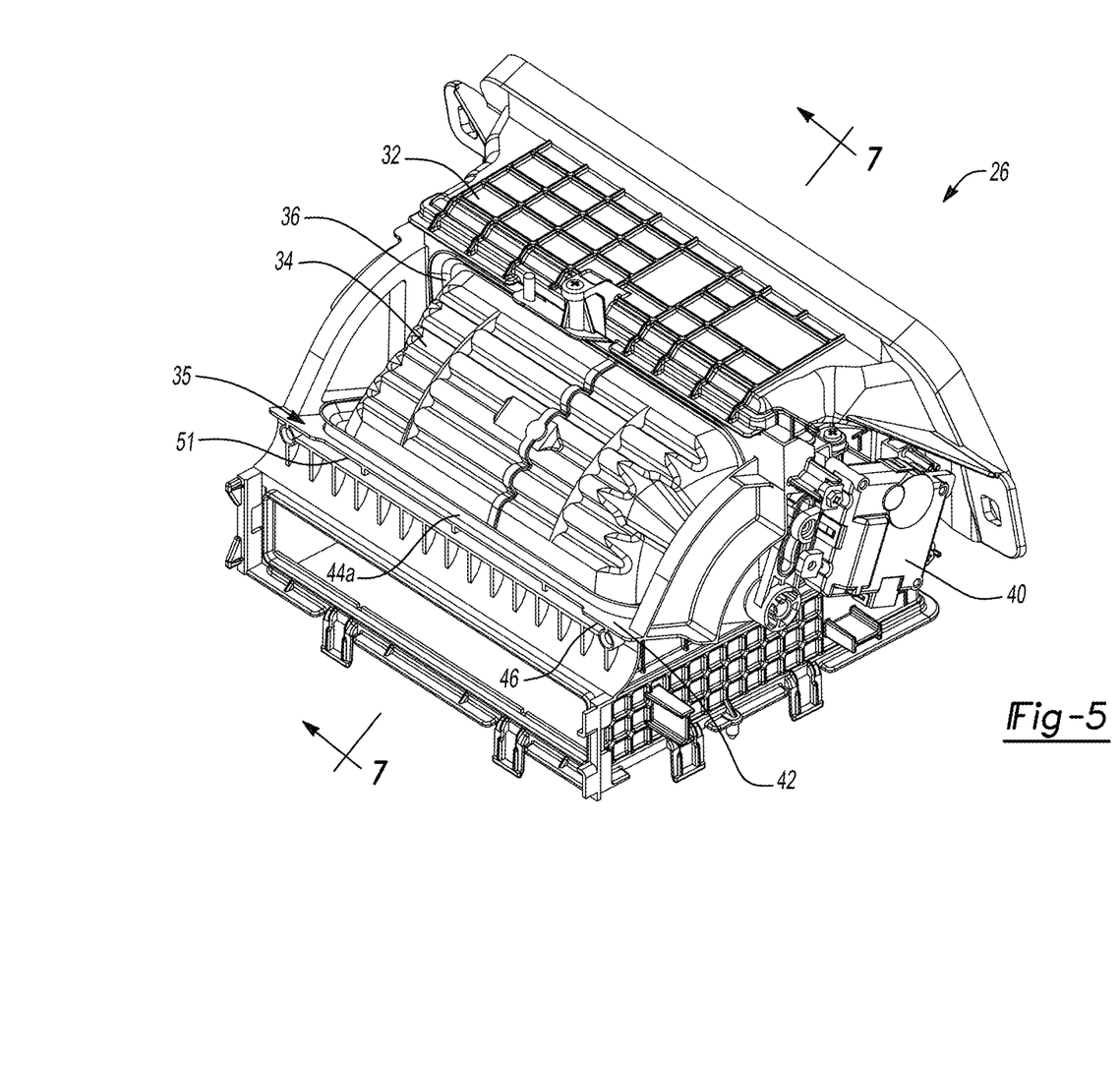
FIG. 5 is another perspective view of the portion of the front blower unit of FIG. 2 with the door in the first position.
Figure 6:
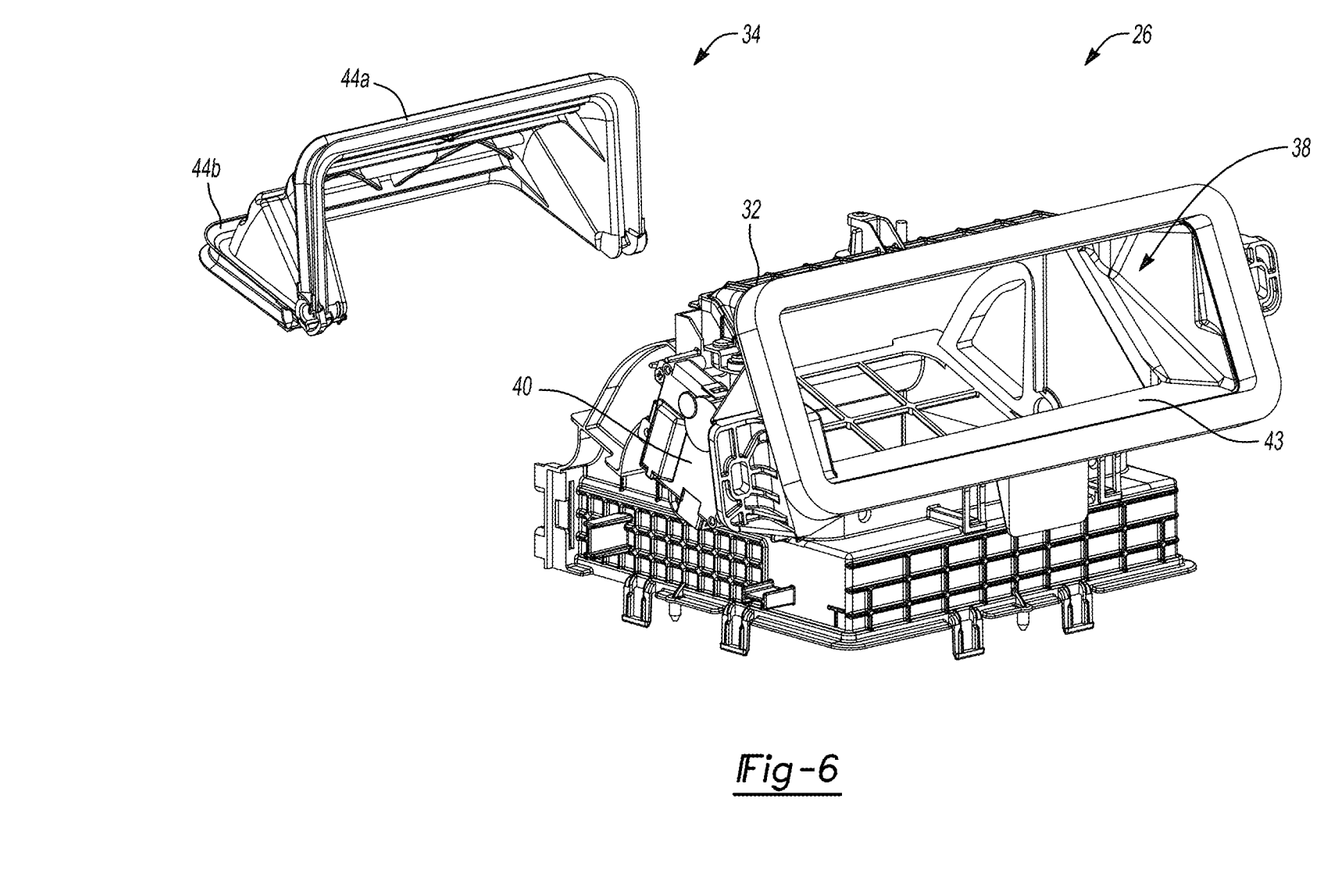
FIG. 6 is an exploded perspective view of the portion of the front blower unit of FIG. 2.

The door 34 may be a barrel shape (FIGS. 6 and 7) and may be coupled to the body portion 32. The door 34 is pivotable between a first position (FIGS. 3, 5 and 7) in which ambient air is able to flow through the second inlet opening 38 and air within the vehicle cabin 18 is restricted from flowing through the first inlet opening 36, and a second position (FIG. 4) in which ambient air is restricted from flowing through the second inlet opening 38 and air within the vehicle cabin 18 is able to flow through the first inlet opening 36. When the vehicle 10 is in a fresh-air mode, the door 34 is in the first position and the blower unit 24 is configured to draw in ambient air to the body portion 32 through the second inlet opening 38. When the vehicle 10 is in an air-recirculation mode, the door 34 is in the second position and the blower unit 24 is configured to draw in air from the vehicle cabin 18 to the body portion 32 through the first inlet opening 36. As shown in FIGS. 5 and 6, a door motor 40 is connected to the body portion 32 and operatively connected to the door 34, and may drive the door 34 between the first and second positions.

Figure 7:
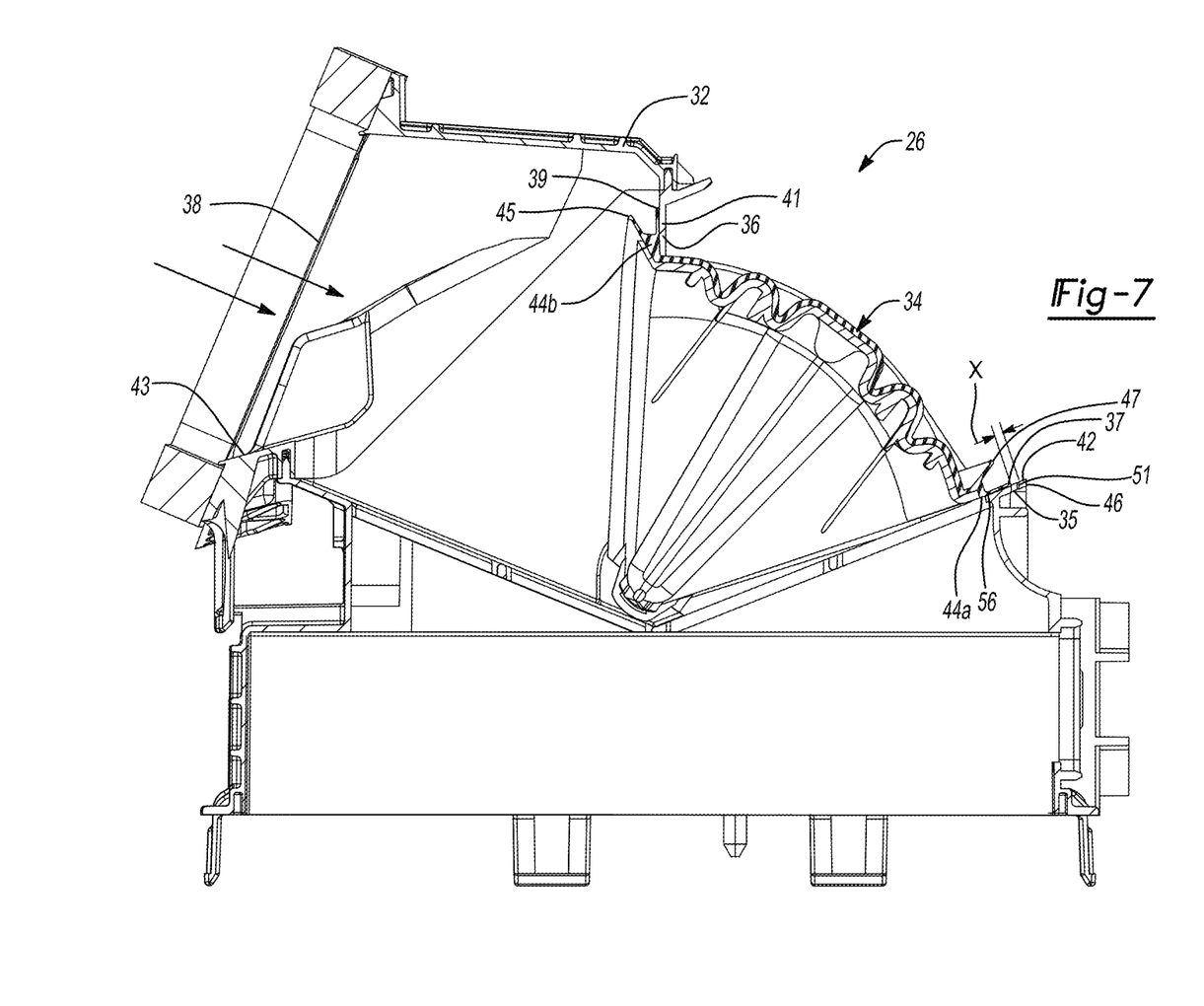
FIG. 7 is a cross-sectional view of the portion of the front blower unit of FIG. 2, taken along line 7-7 of FIG. 5.
Figure 7A:
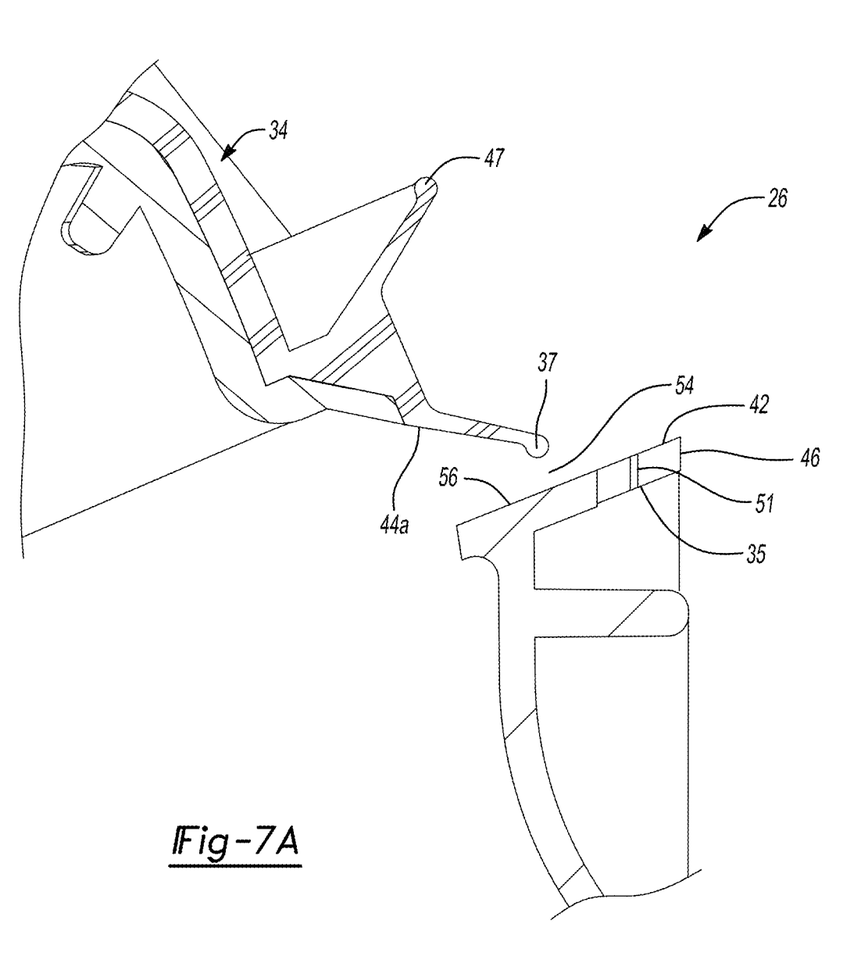
FIG. 7a is a close-up view of a portion of the front blower unit of FIG. 2 as the door moves between the first position and the second position.
Figure 8:
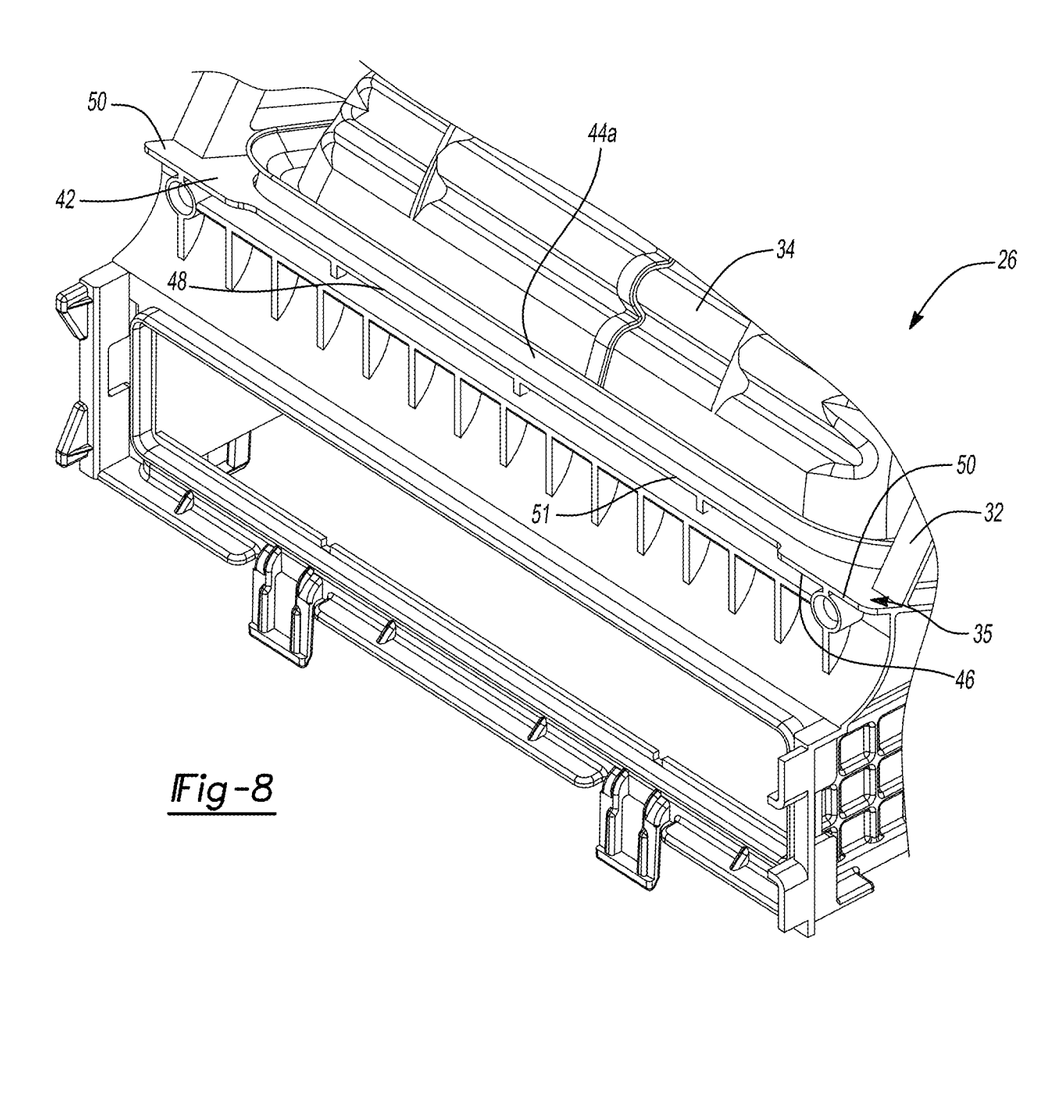
FIG. 8 is a close-up view of a portion of the front blower unit of FIG. 5.
Figure 9A:
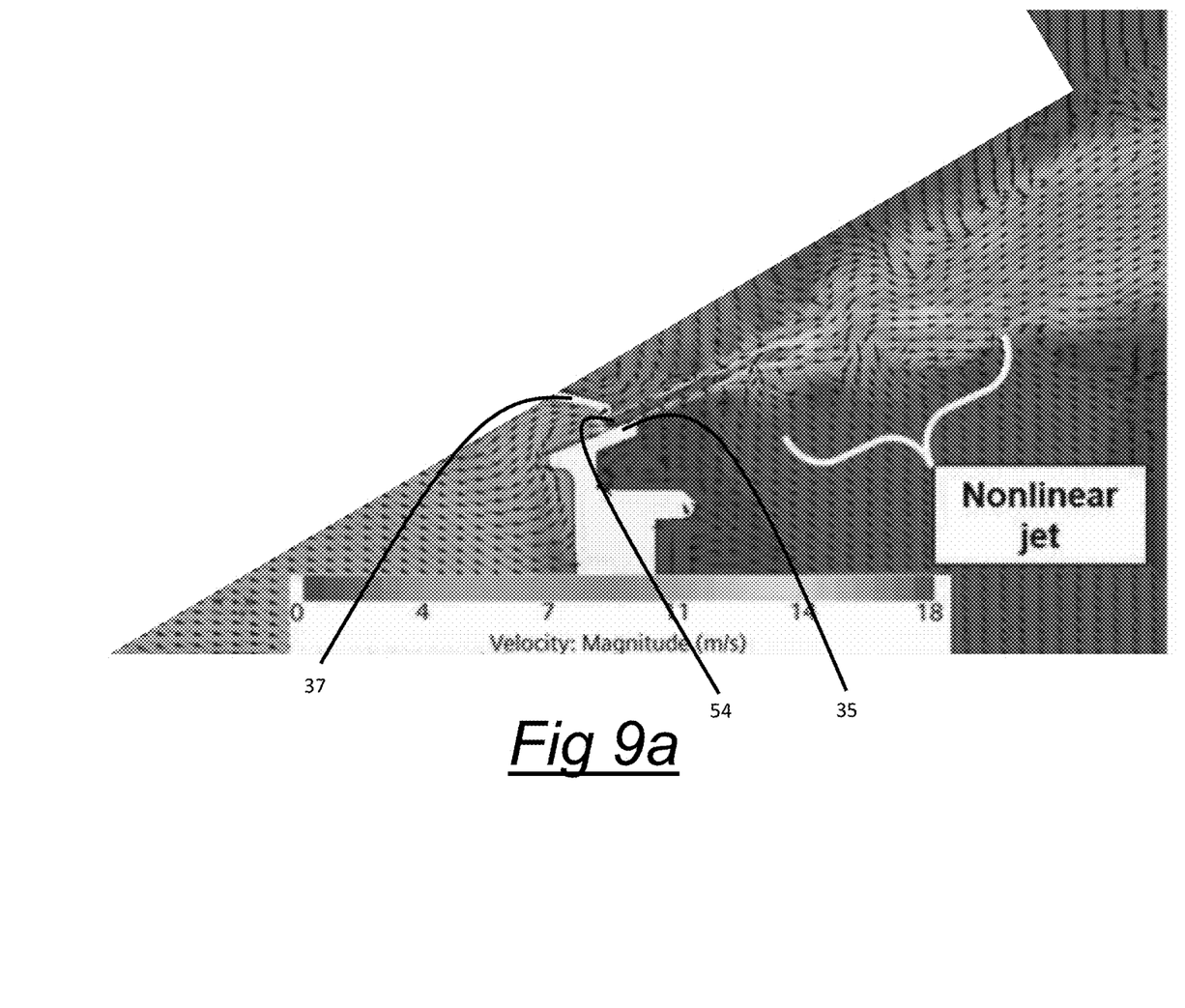
FIG. 9a is a close-up view of a portion of an inlet casing of the HVAC unit of FIG. 2 showing the velocity of the air flowing through a gap between a door of the inlet casing and a body portion of the inlet casing.
Figure 9B:
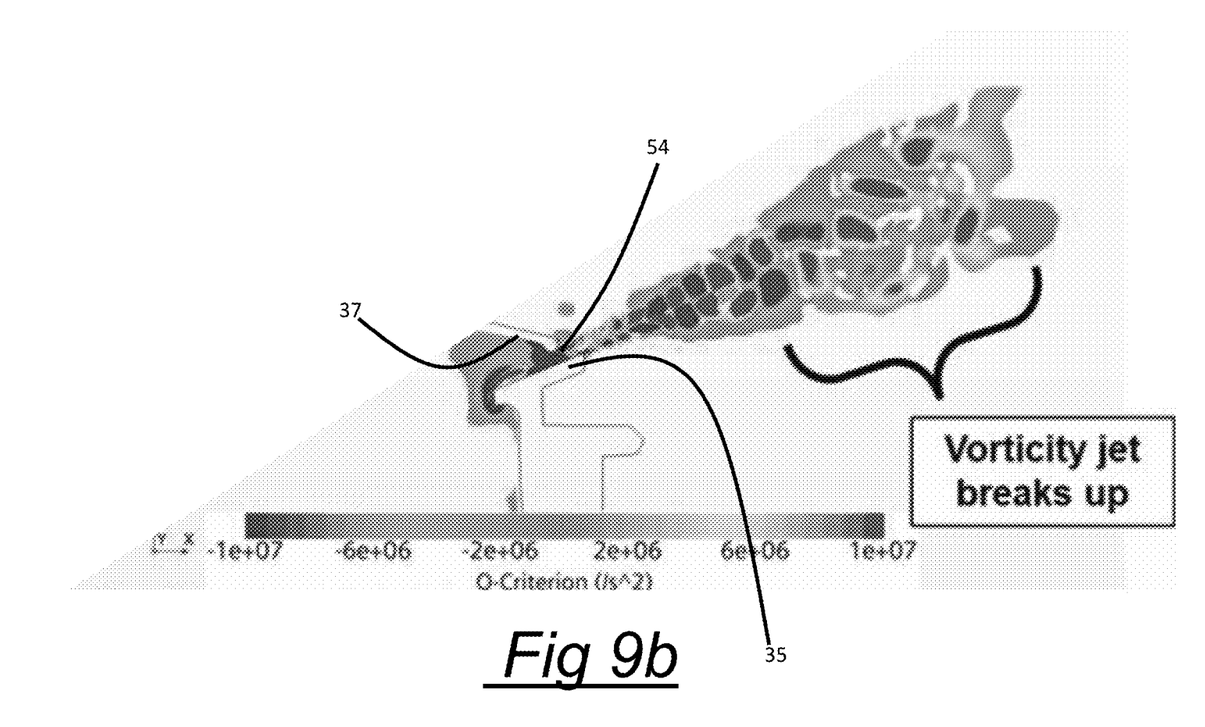
FIG. 9b is a close-up view of a portion of an inlet casing of the HVAC unit of FIG. 2 showing the vorticity of the air flowing through a gap between a door of the inlet casing and a body portion of the inlet casing.
Figure 10A:
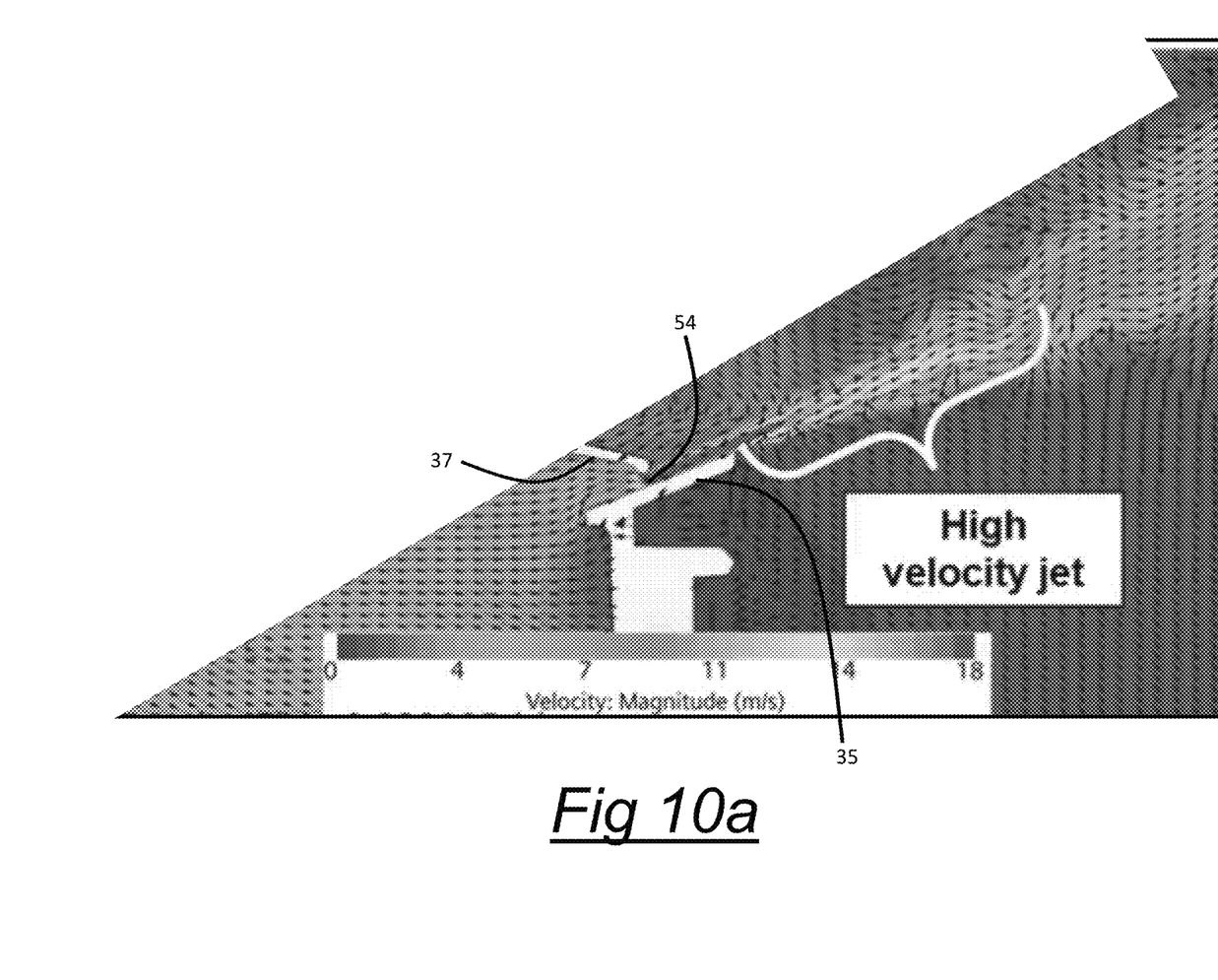
FIG. 10a is a close-up view of a portion of another inlet casing incorporated into the HVAC unit of FIG. 2 showing the velocity of the air flowing through a gap between a door of the inlet casing and a body portion of the inlet casing.
Figure 10B:
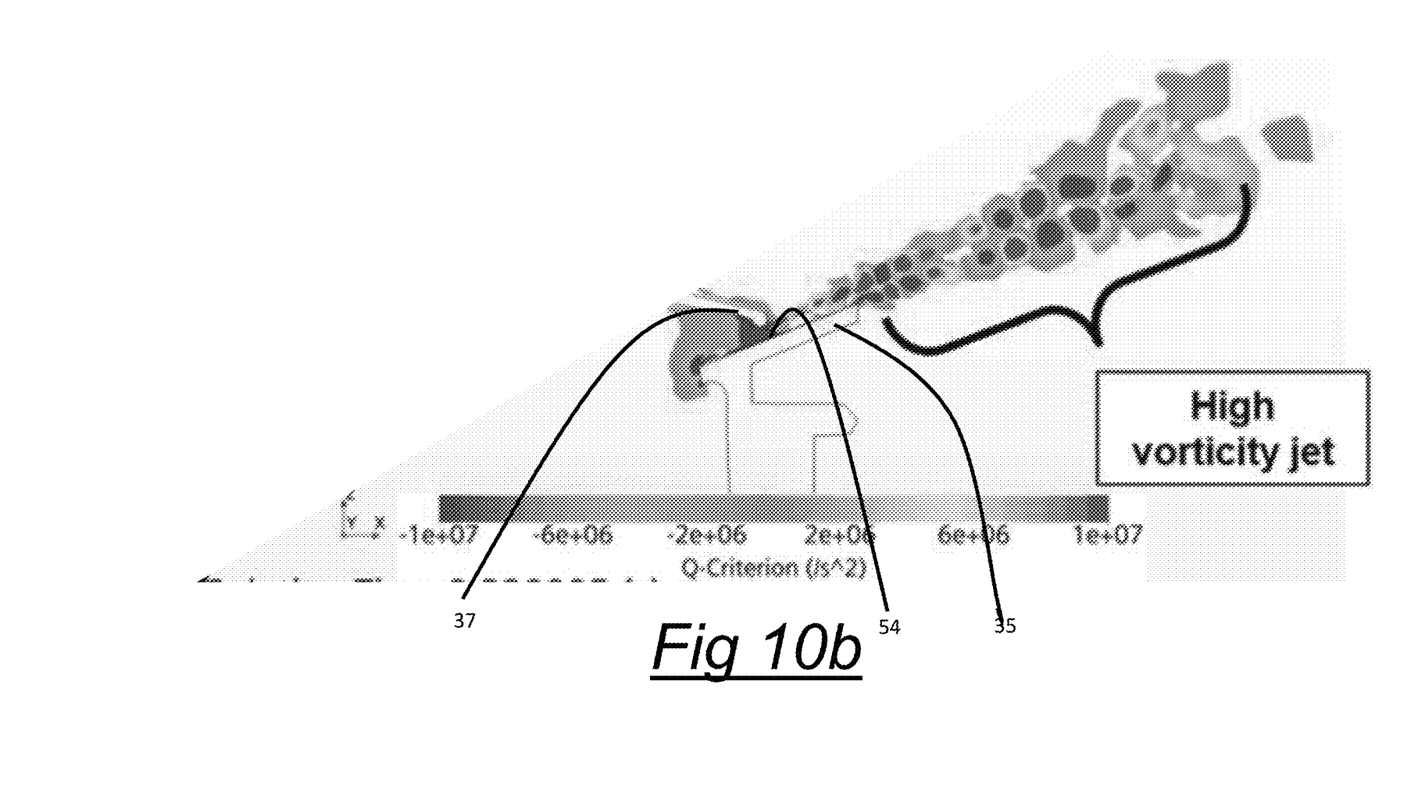
FIG. 10b is a close-up view of a portion of the inlet casing of FIG. 10a showing the vorticity of the air flowing through the gap between the door of the inlet casing and the body portion of the inlet casing.

As shown in FIGS. 5, 7, and 8, the lip portion 35 extends from the body portion 32 and spans a width of the first inlet opening 36. The lip portion 35 is externally located relative to the first inlet opening 36 (the lip portion 35 is positioned outwardly relative to the first inlet opening 36) and includes a ramped or inclined surface 42. In some configurations, the lip portion 35 may include a planar surface. When the door 34 is in the first position, a first seal rim 37 of a first edge 44a of the door 34 is sealingly engaged with the ramped surface 42 of the lip portion 35 that is proximate the first inlet opening 36 while a first seal rim 39 of a second edge 44b (i.e., opposite the first edge 44a) of the door 34 is sealingly engaged with a lip portion 41 of the body portion 32 that defines an opposite side of the first inlet opening 36. When the door 34 is in the second position, a second seal rim 45 of the second edge 44b of the door 34 is sealingly engaged with a surface 43 of the body portion 32 that is proximate the second inlet opening 38 while a second seal rim 47 of the first edge 44a is sealingly engaged with the lip portion 41.

As shown in FIG. 8, the lip portion 35 may also include an elongated slot 48 formed therein that is positioned between opposing sides 50 of the lip portion 35. An edge 51 of the lip portion 35 is positioned between a proximal end 56 of the lip portion 35 and a distal end 46 of the lip portion 35 and partially defines the slot 48. As shown in FIG. 7, a distance X from an outer most location where the door 34 and the ramped surface 42 of the lip portion 35 contact each other to the edge 51 of the lip portion 35 that is further outwardly of the outer most location is between 0.1 millimeters and 5 millimeters. Stated differently, when the door 34 is in the first position, the distance X from a distal end of the first seal rim 37 of the first edge 44a of the door 34 to the edge 51 of the lip portion 35 is between 0.1 millimeters and 5 millimeters. The slot 48 extends the majority of the transverse length of the door 34 and may extend the entire length.

The present disclosure provides the benefit of breaking up the vorticity jet through a gap 54 between the door 34 and the lip portion 35 when the vehicle 10 is being driven (e.g., when the vehicle 10 is being driven on the highway at highway speeds). That is, when the vehicle 10 is being driven and the door 34 is pivoting between the first and second positions, there will exist gap 54 at a certain position through the door 34 travel, through which, noise can be generated due to ambient air flowing through the gap 54 into the cabin 18. The noise is generated by a phenomenon called the Karman Vortex effect. The vortex shedding frequency is what generates the noise and is affected by the Reynolds number $$RE = \frac{uL}{v},$$

where u is the flow speed of the air, v is the kinematic viscosity of the air, and L is the characteristic length. By decreasing the characteristic length (i.e., length of the outer most location where the door 34 and the lip portion 35 contact each other to the edge 51 of the lip portion 35 that is further outwardly of the outer most location), the Reynolds number is reduced which breaks up the vorticity jet through the gap 54. This, in turn, inhibits noise generated from ambient air being forced through the gap 54. Compare FIGS. 9a and 9b to FIGS. 10a and 10b where the size of the lip portion 35 is greater thereby creating a higher vorticity jet flowing through gap 54.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A heating, ventilation, and air condition (HVAC) unit comprising:
   a casing including a body portion and a lip portion extending from the body portion, the body portion defining a first inlet opening and a second inlet opening; and
   a door pivotable between a first position in which ambient air is able to flow through the second inlet opening and air within an occupant cabin is restricted from flowing through the first inlet opening, and a second position in which ambient air is restricted from flowing through the second inlet opening and air within the occupant cabin is able to flow through the first inlet opening,
   wherein a distance from an outward most location where the door and lip portion contact each other to an edge of the lip portion that is further outwardly of the outward most location is between 0.1 millimeters and 5 millimeters.

2. The HVAC unit according to claim 1, wherein the lip portion includes a ramped surface.

3. The HVAC unit according to claim 1, wherein the lip portion spans a width of the first inlet opening.

4. The HVAC unit according to claim 1, wherein the door is sealingly engaged with the lip portion when the door is in the first position.

5. The HVAC unit according to claim 1 further comprising a blower unit configured to draw in ambient air through the second inlet opening when the door is in the first position, wherein the blower unit is configured to draw in air from the occupant cabin through the first inlet opening when the door is in the second position.

6. The HVAC unit according to claim 1, wherein the door has a barrel shape.

7. The HVAC unit according to claim 1, wherein the lip portion extends outwardly from the first inlet opening.

8. The HVAC unit according to claim 1, wherein the lip portion is rectangular-shaped.

9. The HVAC unit according to claim 1, wherein when the door is in the first position, the HVAC unit is in a fresh-air mode, and wherein when the door is in the second position, the HVAC unit is in an air-recirculation mode.

10. The HVAC unit according to claim 1, wherein the lip portion includes an elongated slot formed therein.

11. The HVAC unit according to claim 10, wherein the slot extends along a majority of a longitudinal length of the door.

12. The HVAC unit according to claim 10, wherein the lip portion includes a proximal end and a distal end, and wherein the edge is positioned between the proximal end and the distal end.

13. The HVAC unit according to claim 1, wherein a motor drives the door between the first and second positions.

14. A heating, ventilation, and air condition (HVAC) unit comprising:
   a casing including a body portion and a ledge, the body portion defining a first inlet opening and a second inlet opening, the ledge spanning a width of the first inlet opening and extending outwardly from the first inlet opening; and
   a door coupled to the body portion, the door being pivotable between a first position in which ambient air is able to flow through the second inlet opening and air within an occupant cabin is restricted from flowing through the first inlet opening, and a second position in which ambient air is restricted from flowing through the second inlet opening and air within the occupant cabin is able to flow through the first inlet opening,
   wherein a distance from an outward most location where the door and the ledge contact each other to an edge of the ledge that is further outwardly of the outward most location is between 0.1 millimeters and 5 millimeters.

15. The HVAC unit according to claim 14, wherein the ledge includes a ramped surface.

16. The HVAC unit according to claim 14, wherein the door is sealingly engaged with the ledge when the door is in the first position.

17. The HVAC unit according to claim 14, wherein the lip portion includes an elongated slot formed therein.

18. The HVAC unit according to claim 17, wherein the slot extends the along a majority of a longitudinal length of the door.

19. The HVAC unit according to claim 14, wherein a motor drives the door between the first and second positions.

20. A heating, ventilation, and air condition (HVAC) unit comprising:
   a casing including:
      a body portion defining a first inlet opening and a second inlet opening; and
      a ledge spanning a width of the first inlet opening and extending outwardly from the first inlet opening, the ledge including a ramped surface;
   a barrel-shaped door coupled to the body portion, the door pivotable between a first position in which ambient air is able to flow through the second inlet opening and air within an occupant cabin is restricted from flowing through the first inlet opening, and a second position in which ambient air is restricted from flowing through the second inlet opening and air within the occupant cabin is able to flow through the first inlet opening; and
   a blower unit configured to draw in ambient air through the second inlet opening when the door is in the first position and configured to draw in air from the occupant cabin through the first inlet opening when the door is in the second position,
   wherein a distance from an outward most location where the door sealingly engages the ledge to an edge of the ledge that is further outwardly of the outward most location is between 0.1 millimeters and 5 millimeters.

* * * * *

UNITED STATES PATENT AND TRADEMARK OFFICE
CERTIFICATE OF CORRECTION

PATENT NO. : 11,679,644 B2  
APPLICATION NO. : 17/219378  
DATED : June 20, 2023  
INVENTOR(S) : Javier Rodriguez et al.

Page 1 of 1

It is certified that error appears in the above-identified patent and that said Letters Patent is hereby corrected as shown below:

In the Claims

Column 8, Line 16: In Claim 18, after "extends", delete "the"

Signed and Sealed this  
Eighth Day of August, 2023

Katherine Kelly Vidal  
*Director of the United States Patent and Trademark Office*